US005760126A

United States Patent [19]
Engle et al.

[11] Patent Number: 5,760,126
[45] Date of Patent: Jun. 2, 1998

[54] AQUEOUS FLUOROCHEMICAL COMPOSITIONS AND ABRASION-RESISTANT COATINGS THEREFROM

[75] Inventors: Lori P. Engle, Little Canada; Steven J. Hamrock, St. Paul; George G. I. Moore, Afton; Mark J. Pellerite; Dong-Wei Zhu, both of Woodbury, all of Minn.

[73] Assignee: Minnesota Mining and Manufacturing Company, St. Paul, Minn.

[21] Appl. No.: 771,786

[22] Filed: Dec. 20, 1996

[51] Int. Cl.$^6$ ............................................. C08L 39/04
[52] U.S. Cl. ........................... 524/516; 523/216; 524/520
[58] Field of Search ............................. 524/516, 520

[56] References Cited

U.S. PATENT DOCUMENTS

| | | | |
|---|---|---|---|
| 2,801,185 | 7/1957 | Iler | 106/288 |
| 4,416,941 | 11/1983 | Barsotti | 524/512 |
| 4,522,958 | 6/1985 | Das et al. | 523/212 |
| 4,764,564 | 8/1988 | Schmidt et al. | 525/328.2 |
| 4,929,666 | 5/1990 | Schmidt | 524/516 |
| 5,006,624 | 4/1991 | Schmidt et al. | 526/243 |
| 5,073,404 | 12/1991 | Huang | 427/39 |
| 5,284,900 | 2/1994 | Izubayashi | 524/503 |
| 5,294,662 | 3/1994 | Moore et al. | 524/516 |
| 5,324,566 | 6/1994 | Ogawa et al. | 428/141 |
| 5,328,768 | 7/1994 | Goodwin | 428/428 |
| 5,382,639 | 1/1995 | Moore et al. | 526/243 |
| 5,407,709 | 4/1995 | Ogawa et al. | 427/539 |
| 5,437,894 | 8/1995 | Ogawa et al. | 427/535 |
| 5,470,908 | 11/1995 | Schmidt | 524/516 |
| 5,578,669 | 11/1996 | Odawa | 524/501 |
| 5,608,003 | 3/1997 | Zhu | 524/516 |

OTHER PUBLICATIONS

R.K. Iler, "Uses of Colloidal Silicas," *The Chemistry of Silica*, John Wiley & Sons, New York, pp. 415–461, (1979).
K. K. Dietliker, "Commercial Sources of Free Radical Photoinitiators," *Chemistry & Technology of UV & EB Formulation for Coatings, Inks & Paints*, vol. 3, pp. 276–298, SITA Technology Ltd., London (1991).
Larry N. Lewis and Dimitris Katsamberis, "Ultraviolet–Curable Abrasion–Resistant, and Weatherable Coatings with Improved Adhesion," *Journal of Applied Polymer Science*, 42, pp. 1551–1556 (1991).
Takeo Saegusa & Yoshiki Chujo, "Organic–Inorganic Polymer Hybrids," *Makromol. Chem., Macromol. Symp.*, 64, pp. 1–9 (1992).
Donald L. Schmidt et al., "Water–based non–stick hydrophobic coatings," *Nature*, 368, pp. 39–41, Mar. 3, 1994.
N. Tsubokawa, et al., "Polymerization of Vinyl Monomers in the Presence of Silica Having Surface Functional Groups," *Colloid and Polymer Science*, 271, pp. 940–946 (1993).
W.A. Zisman, "Contact Angle, Wettability, and Adhesion," *Advances in Chemistry Series 43, American Chemical Society*, pp. 1–3, Washington, D.C. (1964).
Program Profile for "Colloidal Silica," Nalco Chemical Company, (1989).
Data Sheet for "Ludox® Colloidal Silica," DuPont Company (6 pages).

*Primary Examiner*—Paul R. Michl
*Attorney, Agent, or Firm*—Lucy C. Weiss

[57] ABSTRACT

Water-based coating compositions comprise an aqueous solution, emulsion, or dispersion of (a) a water-soluble or water-dispersible polymer or oligomer having at least one anionic moiety which is capable of reacting with an oxazoline or oxazine moiety; (b) a water-soluble or water-dispersible polymer or oligomer having at least one oxazoline or oxazine moiety; and (c) a sol comprising a colloidal dispersion of surface-modified, inorganic microparticles in liquid; at least one of the components (a), (b), and (c) further comprising at least one fluoroaliphatic moiety. The compositions can be used to form hard coatings having low surface energy and high abrasion resistance.

30 Claims, No Drawings

5,760,126

AQUEOUS FLUOROCHEMICAL COMPOSITIONS AND ABRASION-RESISTANT COATINGS THEREFROM

FIELD OF THE INVENTION

This invention relates to water-based, fluorine-containing coating compositions comprising organic and inorganic materials. Coatings comprising the cured compositions exhibit both low surface energy properties and abrasion resistance.

BACKGROUND OF THE INVENTION

Water-based, crosslinkable, fluorochemical low surface energy coating systems made from polymeric surfactants and oxazoline polymer crosslinkers have been described in U.S. Pat. Nos. 5,382,639, 5,294,662, 5,006,624, and 4,764,564.

The present invention has filled a void by providing a low surface energy, hard coating system with improved abrasion resistance. The coating system integrates a fluorine-containing, crosslinkable organic polymeric surfactant and surface-modified, colloidal inorganic microparticles.

SUMMARY OF THE INVENTION

Briefly, in one aspect, this invention provides a water-based composition comprising an aqueous solution, emulsion, or dispersion of: (a) a water-soluble or water-dispersible polymer or oligomer having at least one anionic moiety which is capable of reacting with an oxazoline or oxazine moiety; (b) a water-soluble or water-dispersible polymer or oligomer having at least one oxazoline or oxazine moiety; and (c) a sol comprising a colloidal dispersion of surface-modified, inorganic microparticles in liquid. At least one of components (a), (b), and (c) has at least one fluoroaliphatic moiety, and either polymer or oligomer (a) or (b) (or both) can further contain at least one silyl moiety.

As used herein, the term "surface-modified" refers to microparticles which have either polymeric or non-polymeric, surface-attached organic moieties, which are preferably reactive with functional group(s) on component (a) and/or component (b). The sol (c) preferably comprises an aqueous dispersion of polymer-grafted silica microparticles.

In other aspects, this invention provides a coating comprising the cured composition, which comprises crosslinked polymer (e.g., containing at least one amide-ester crosslink moiety derived from the reaction of carboxyl groups with oxazoline or oxazine moieties) having colloidal, surface-modified, inorganic microparticles integrated therein, and a coated article comprising the coating.

The coating compositions can be used to provide a low surface energy hard coat to protect surfaces of essentially any kind (e.g., poly(vinyl chloride), polycarbonate, polyester, nylon, metals (either painted or bare), glass, wood, stone, etc.). The good abrasion resistance properties will protect such surfaces from physical damage, and the low surface energy properties will provide easily cleanable and possibly antigraffiti properties. The coating can also be used as a low adhesion backsize for adhesives.

The significant difference of the present invention over related technologies is the incorporation of colloidal, surface-modified, inorganic microparticles into the coating composition. The previous organic polymer-based coating systems have been transformed into organic-inorganic composite compositions. The finished coatings therefore become much more abrasion-resistant and are more durable in protective applications. Unexpectedly, the antigraffiti and release properties of the coating systems are also not degraded despite the incorporation of the high surface energy, hydrophilic, colloidal, surface-modified, inorganic microparticles, even with compositions containing a lower weight percentage of fluorine in many cases.

In comparison with similar coating compositions comprising unmodified inorganic microparticles, the coating compositions of the invention exhibit improved dispersion stability and, upon dry-down, provide coatings which generally exhibit better abrasion resistance coupled with better low surface energy properties (as measured by water contact angles or by the pen test defined below).

DETAILED DESCRIPTION OF THE INVENTION

As used herein "anionic" means capable of forming anions in aqueous media. As used herein, "copolymers" or "polymers" includes polymers and oligomers.

The anionic moiety-containing polymers useful in this invention preferably have an average of more than two reactive ionic moieties per polymer chain. Preferably, the anionic moiety-containing polymers have an average of more than one fluoroaliphatic moiety per polymer chain. Such polymers include those described, for example, in U.S. Pat. Nos. 5,382,639, 5,294,662, 5,006,624 and 4,764,564 supra, which descriptions are incorporated herein by reference.

Useful anionic moieties include carboxy and mercaptan moieties, which can be reacted with bases to obtain carboxylate and mercaptide salts. At lower pH values, these moieties become essentially nonionic. The particularly preferred anionic moiety is carboxylate. The carboxylate anionic polymer can be utilized in the water-based compositions of this invention as its ammonium salts.

The anionic moiety-containing polymers, polymer component, or surfactant, useful in the present invention, can be prepared, for example, by the addition polymerization of one or more ethylenically unsaturated carboxy-containing monomers (e.g., acrylic acid, methacrylic acid, and esters thereof such as 2-carboxyethyl acrylate) with one or more ethylenically unsaturated comonomers (e.g., acrylic esters, vinyl ethers, or styrenic monomers). The comonomers can be further substituted with fluorine. The carboxy-containing monomer is preferably acrylic acid or 2-carboxyethyl acrylate. Preferably, the anionic moiety-containing polymers further contain a fluoroaliphatic radical-containing, ethylenically unsaturated monomer, such as perfluoroalkyl-substituted acrylate esters, e.g., $CH_2=CHCOOCH_2CH_2N(Et)SO_2C_8F_{17}$, or fluoroalkyl vinyl ethers, e.g., $CH_2=CHOCH_2C_7F_{15}$, which can be incorporated into the anionic moiety-containing polymer by addition polymerization.

The oxazine or oxazoline polymers or oligomers useful in the present invention can be prepared by the addition polymerization of an oxazine- or oxazoline-containing ethylenically unsaturated monomer, such as 2-isopropenyl-2-oxazoline (IPO) and those represented by the general structures:

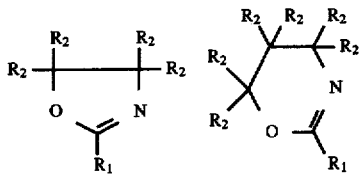

wherein $R_1$ is an unsaturated organic radical capable of addition polymerization, such as 1,2-ethylenic unsaturation. Preferably, $R_1$ is an isopropenyl group. Each $R_2$ is independently hydrogen, halogen, or a substituted organic radical, preferably $R_2$ is hydrogen. Optionally an aliphatic or fluoroaliphatic radical-containing, ethylenically unsaturated monomer, such as acrylate esters, e.g., $CH_2=CHCO_2CH_2CH_2N(Et)SO_2C_8F_{17}$, vinyl ether, or styrenic monomers can be copolymerized with the oxazine- or oxazoline-containing ethylenically unsaturated monomer.

The oxazoline- or oxazine-containing polymers useful in the present invention preferably have an average of more than two oxazoline or oxazine moieties per polymer chain. If desired, aziridine group-containing oligomers can be utilized in place of the oxazoline- or oxazine-containing polymers or oligomers, provided that shelf stability or one-part formulation is not required.

The aliphatic moiety of the aliphatic radical-containing monomer, if present, can be a monovalent aliphatic or alicyclic moiety, preferably saturated. It can be linear, branched, cyclic, or combinations thereof. It can contain catenary, i.e., in-chain, heteroatoms bonded only to carbon atoms, such as oxygen, divalent or hexavalent sulfur, or nitrogen. The aliphatic moiety has from 1 to about 20 carbon atoms, preferably from 1 to about 10 carbon atoms.

The fluoroaliphatic moiety of the fluoroaliphatic radical-containing monomer, if present, can be a fluorinated, stable, inert, preferably saturated, non-polar, monovalent aliphatic or alicyclic moiety. It can be straight chain, branched chain, cyclic, or combinations thereof. It can contain catenary heteroatoms, bonded only to carbon atoms, such as oxygen, divalent or hexavalent sulfur, or nitrogen. A fully-fluorinated moiety is preferred but hydrogen or chlorine atoms can be present as substituents, provided that not more than one atom of either is present for every two carbon atoms. The moiety has at least about 3 carbon atoms, preferably from about 3 to about 20 carbon atoms, and most preferably from about 4 to about 10 carbon atoms. The terminal portion of the moiety is a perfluorinated moiety which preferably contains at least 7 fluorine atoms, e.g., $CF_3CF_2CF_2—$, $(CF_3)_2CF—$, $F_5SCF_2—$, or the like.

The polymers useful in this invention, i.e., those having at least one anionic moiety (the surfactant component), or those having at least one oxazoline or oxazine moiety (the cross-linking component), can optionally contain at least one silyl moiety. The silyl moiety can be formed on one or both of the polymers by a compound which can be represented by the formula

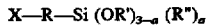

X—R—Si (OR')$_{3-a}$ (R")$_a$ wherein X is a group reactive to radical polymerization, such as an unsaturated acrylate or methacrylate radical or a mercapto group; R is alkylene of 1 to about 10 carbon atoms; R' is hydrogen or alkyl of 1 to about 3 carbon atoms; R" is selected from the group consisting of lower alkyl groups having from 1 to about 4 carbon atoms and phenyl; and a is an integer of 0 to 2 (preferably, 0).

The silyl moiety can be incorporated either in the polymer chain, using, for example, a trialkoxysilylalkyl acrylate or methacrylate, or at the terminal end of the polymer chain via a chain transfer agent, using, for example, a trialkoxysilylalkyl mercaptan, preferably mercaptopropyltrimethoxysilane (MPTS). Preferably, the silyl moiety is attached to the surfactant component, the anionic moiety-containing polymer.

Other functional groups can optionally be incorporated into the surfactant or cross-linking polymer components, such as polymerizable ultraviolet (UV) absorbers, e.g., NORBLOC™ 7966 (((2-(2'-)hydroxy-5-methacryloyloxyethylphenyl)-2H-benzotriazole); available from Noramco Inc.).

Inorganic microparticles suitable for use in the compositions of the invention are colloidal in size (e.g., having an average particle diameter in the range of from about 2 nanometers (2 millimicrons) to about 200 nanometers. Colloidal silica is generally most preferred, but other colloidal metal oxides, e.g., colloidal titania, colloidal alumina, colloidal zirconia, colloidal vanadia, colloidal chromia, colloidal iron oxide, colloidal antimony oxide, colloidal tin oxide, and mixtures thereof (with each other and/or with colloidal silica), can also be utilized. The colloidal microparticles can comprise essentially a single oxide such as silica or can comprise a core of an oxide of one type (or a core of a material other than a metal oxide) on which is deposited an oxide of another type.

Generally, the microparticles can range in size (average particle diameter) from about 2 nanometers to about 200 nanometers, preferably from about 5 nanometers to about 100 nanometers, more preferably from about 20 nanometers to about 75 nanometers. The use of microparticles larger than about 75 nanometers may provide a final crosslinked coating which is translucent or even opaque, in contrast to the transparent coatings generally provided by the use of smaller particles.

It is also preferable that the colloidal microparticles be relatively uniform in size (have a substantially monodisperse size distribution or a polymodal distribution obtained by blending two or more substantially monodisperse distributions) and remain substantially non-aggregated (substantially discrete), as microparticle aggregation can result in precipitation, gellation, or a dramatic increase in sol viscosity and can reduce both adhesion to substrate and optical clarity. Thus, a particularly desirable class of microparticles for use in preparing the compositions of the invention includes sols of inorganic microparticles (e.g., colloidal dispersions of inorganic microparticles in liquid media), especially sols of amorphous silica. Such sols can be prepared by a variety of techniques and in a variety of forms which include hydrosols (where water serves as the liquid medium), organosols (where organic liquids are used), and mixed sols (where the liquid medium comprises both water and an organic liquid). See, e.g., the descriptions of the techniques and forms given in U.S. Pat. Nos. 2,801,185 (Iler) and 4,522,958 (Das et al.), which descriptions are incorporated herein by reference, as well as those given by R. K. Iler in *The Chemistry of Silica*, John Wiley & Sons, New York (1979).

Due to their surface chemistry, low cost, and environmental considerations, silica hydrosols are generally most preferred for use in preparing the compositions of the invention. Such hydrosols are available in both acidic and basic forms and in a variety of particle sizes and concentrations from, e.g., Nyacol Products, Inc. in Ashland, Md.; Nalco Chemical Company in Oakbrook, Ill.; and E. I. duPont de Nemours and Company in Wilmington, Del. Concentrations of from about 2 to about 50 percent by weight of silica in water are generally useful. If desired, silica hydrosols can be prepared, e.g., by partially neutralizing an aqueous solution of an alkali metal silicate with acid to a pH of about 8 or 9 (such that the resulting sodium content of the solution is less than about 1 percent by weight based on sodium oxide). Other methods of preparing silica hydrosols, e.g., electrodialysis, ion exchange of sodium silicate, hydrolysis of silicon compounds, and dissolution of elemental silicon are described by Iler, supra.

Sols of surface-modified microparticles suitable for use in the compositions of the invention include sols of polymer-grafted microparticles. (As used herein, "polymer-grafted microparticles" are microparticles having linear or branched polymer chains covalently bonded to the microparticle (through surface-attached coupling agent).) Generally, such a sol is prepared first and then combined with the other components (a) and (b) of the composition. Such a sol can also be prepared in the presence of component (a) and/or component (b) or in the presence of the monomeric starting materials used for preparing component (a) and/or component (b). The latter procedure can result in the surface attachment (e.g. grafting) of component (a) and/or component (b) to the microparticles, thereby providing a one-component or two-component composition (i.e., a three-component composition, as described above, wherein the same material serves as more than one of the three components). The resulting sol can be mixed with additional amounts of component (a) and/or component (b), if desired.

Preparation of the sol generally requires that at least a portion of the surface of the inorganic microparticles be modified by chemical reaction (or strong physical interaction) with a coupling agent. Suitable coupling agents are not only capable of reacting (or strongly interacting) with chemical groups on the surface of the microparticles, but also comprise at least one functional group, e.g., —CH$_2$SH, —CH$_2$NH$_2$, —CH$_2$OC(O)CH=CH$_2$, etc., which can function as a site for grafting during free radical polymerization (e.g., a chain transfer group or a free-radically polymerizable, ethylenically-unsaturated group).

For example, silica microparticles can be treated with hydrolyzable, chain transfer group-containing organosilanes under conditions such that silanol groups on the surface of the particles chemically bond with hydrolyzed silane groups to produce covalent silicon-oxygen-silicon bonds. The surface of silica (or other metal oxide) particles can also be treated with other chemical compounds, e.g., hydrolyzable, chain transfer group-containing organotitanates, which are capable of attaching to the surface of the particles by a chemical bond (covalent or ionic) or by a strong physical bond, and which comprise at least one functional group, e.g., —CH$_2$SH, —CH$_2$NH$_2$, etc., which can function as a chain transfer site for free radical polymerization.

Treatment with hydrolyzable, chain transfer group-containing organosilanes is generally preferred. A preferred class of such compounds can be represented by the general formula

(as well as partial hydrolyzates and condensates thereof) wherein Y is a chain transfer group (preferably, a moiety selected from the group consisting of mercapto, amino-containing, oxygen-containing, and halogen-containing groups; more preferably, mercapto); R is a divalent group selected from the group consisting of alkylene groups having from 1 to about 12 carbon atoms and arylene groups having from about 6 to about 12 carbon atoms; X is a hydrolyzable group (preferably, a group selected from the group consisting of halogen, alkoxy groups having from 1 to about 12 carbon atoms and optionally containing from 1 to about 11 ether oxygen atoms, acyloxy, amino, and alkylamino); R$^1$ is selected from the group consisting of lower alkyl groups having from 1 to about 4 carbon atoms and phenyl; and a is an integer of 0 to 2 (preferably, 0).

Representative examples of preferred hydrolyzable, chain transfer group-containing organosilanes include
3-mercaptopropyltrimethoxysilane,
4-mercaptobutyltriethoxysilane,
4-mercaptobutyldimethoxymethylsilane,
6-mercaptohexyltrimethoxysilane,
4-mercaptocyclohexyltrimethoxysilane,
3-aminopropyltrimethoxysilane,
4-aminobutyltriethoxysilane,
4-aminobutyldimethoxymethylsilane,
6-aminohexyltrimethoxysilane,
4-aminocyclohexyltrimethoxysilane,
3-chloropropyltrimethoxysilane,
4-chlorobutyltriethoxysilane,
4-chlorobutyldimethoxymethylsilane,
6-chlorohexyltrimethoxysilane,
4-chlorocyclohexyltrimethoxysilane, N,N-dimethylaminopropyltrimethoxysilane, glycidoxypropyltrimethoxysilane, and mixtures thereof.

In preparing the sols of polymer-grafted microparticles, a hydrosol (e.g., a silica hydrosol), a mixed sol (e.g., a mixed silica sol, wherein the liquid medium comprises an aqueous solution of at least one preferably water-soluble organic solvent such as methanol, ethanol, acetone, tetrahydrofuran, ethylene glycol, 1-methyl-2-pyrrolidinone, isopropanol, propoxyethanol, or the like), or an organosol (e.g., a silica organosol, where the organic liquid medium comprises benzene, toluene, propoxyethanol, 1-methyl-2-pyrrolidinone, dimethyl formamide, isopropanol, ethylene glycol, or the like) can generally be first combined with coupling agent(s) and the resulting combination allowed to react. Heat (and agitation) can be applied to facilitate reaction. (The skilled artisan will recognize that the concentration and/or pH of the sol may require adjustment to enhance the stability (and minimize the viscosity) of the sol during reaction with the coupling agent and, later, with monomer. Coupling agent can generally be used in an amount such that at least a portion of the surface of the microparticles is modified sufficiently to enable effective graft polymerization (upon combination with monomer and initiator).

Preferably, the amount of coupling agent is selected to be, e.g., from about $1\times10^{-4}$ to about $7\times10^{-3}$, preferably from about $2\times10^{-4}$ to about $3\times10^{-3}$, and more preferably from about $3\times10^{-4}$ to about $2\times10^{-3}$ millimoles of coupling agent per square meter of microparticle surface area. The resulting mixture can be agitated and maintained at a temperature of, e.g., from about 20° C. to about 100° C., preferably from about 50° C. to about 100° C. (e.g., for about one to about 24 hours) to enable the reaction (or other interaction) of the coupling agent with chemical groups on the surface of the microparticles. This provides a colloidal dispersion of inorganic microparticles which have surface-attached or surface-bonded organic groups.

One or more free-radically polymerizable, ethylenically-monounsaturated monomers can then be added to the resulting colloidal dispersion of surface-modified microparticles. (Optionally, small amounts of one or more free-radically polymerizable, ethylenically-polyunsaturated monomers can also be added to provide a degree of crosslinking, if desired.) Monomer(s) should generally be added in an amount greater than the molar equivalent of coupling agent utilized. For example, from about 0.001 to about 0.10 mole of monomer(s) per gram $SiO_2$ can be utilized. The resulting mixture (which can include surfactant to enable graft polymerization of water-insoluble monomer in an aqueous medium) can be purged of oxygen, an effective amount of a thermally- or radiation-activatable free radical initiator can be added, and the mixture can then be heated (to a temperature sufficient to decompose the free radical source, e.g., from about 20° C. to about 130° C.) or can be irradiated to effect polymerization of the monomer.

Suitable monomers for use in preparing the polymer-grafted microparticles are free-radically polymerizable, ethylenically-unsaturated monomers (or monomer mixtures). Useful monomers include, for example, ethylenically-unsaturated acids and anhydrides; ethylenically-unsaturated macromers; ethylenically-unsaturated, substituted and unsubstituted esters, amides, and nitriles; vinyl monomers; vinylidene monomers; other olefinic monomers such as styrene, ethylene, tetrafluoroethylene, and hexafluoropropene; fluorochemical-containing acrylates and methacrylates; and heterocyclic monomers.

Representative monomers include, for example, carboxyethyl acrylate; acrylic acid; methacrylic acid; itaconic acid; citraconic acid; aconitic acid; maleic acid; maleic anhydride; fumaric acid; crotonic acid; cinnamic acid; oleic acid; vinyl sulfonic acid; vinyl phosphonic acid; alkyl, cycloalkyl, and fluoroalkyl-containing esters of the foregoing acids, where the alkyl, cycloalkyl, and fluoroalkyl groups have from 1 to about 18 carbon atoms (such as, for example, ethyl, butyl, 2-ethylhexyl, octadecyl, 2-sulfoethyl, 3-sulfopropyl, acetoxyethyl, cyanoethyl, hydroxyethyl, and hydroxypropyl acrylates and methacrylates); amides of the foregoing acids (such as, for example, acrylamide, methacrylamide, methylolacrylamide, and 1,1-dimethylsulfoethylacrylamide); acrylate or methacrylate end-capped polyethylene glycols; acrylonitrile; methacrylonitrile; styrene; α-methylstyrene; p-hydroxystyrene; chlorostyrene; sulfostyrene; N,N-dimethyl-N-methacryloxymethyl-N-(3-sulfopropyl) ammonium betaine; N-vinyl pyrrolidone; vinyl acetate; vinyl chloride; vinyl fluoride; vinyl ethers; vinyl sulfides; vinyl toluene; butadiene; isoprene; chloroprene; ethylene; isobutylene; vinylidene chloride; vinylidene fluoride; tetrafluoroethylene; hexafluoropropene; sulfated castor oil; sulfated sperm oil; sulfated soybean oil; sulfonated dehydrated castor oil; and mixtures thereof. Particularly useful monomers include, for example, carboxyethyl acrylate, isopropenyl oxazoline, alkyl acrylates and methacrylates having from 1 to about 18 carbon atoms, acrylic acid, methacrylic acid, itaconic acid, fluorochemical-containing acrylates and methacrylates, and mixtures thereof. Monomers which are not soluble in the liquid medium can be solubilized by the addition of solubilizing organic liquid and/or surfactant in an amount sufficient to provide solution or emulsification of the monomers.

Useful free radical initiators include inorganic and organic peroxides, hydroperoxides, persulfates, azo compounds, redox systems (e.g., a mixture of $K_2S_2O_8$ and $Na_2S_2O_5$), and free radical photoinitiators such as those described by K. K. Dietliker in *Chemistry & Technology of UV & EB Formulation for Coatings, Inks & Paints*, Volume 3, pages 276–298, SITA Technology Ltd., London (1991). Representative examples include hydrogen peroxide, potassium persulfate, t-butyl hydroperoxide, benzoyl peroxide, t-butyl perbenzoate, cumene hydroperoxide, and azobis (isobutyronitrile) (AIBN). The skilled artisan will recognize that the choice of initiator will depend upon the particular reaction conditions, e.g., choice of solvent.

Polymerization of the ethylenically-monounsaturated monomer(s) provides a colloidal dispersion of polymer-grafted microparticles. The microparticles have linear or branched polymer chains covalently bonded to surface-attached coupling agent. If desired, two or more sequential grafting polymerization reactions can be carried out. The skilled artisan will recognize that monomer(s) can be selected so as to optimize the dispersion stability and the final properties of the resulting coatings.

Also useful in preparing the compositions of the invention are sols of microparticles which, unlike the above-described polymer-grafted microparticles, have been surface-modified by treatment only with one or more non-polymeric coupling agents. Such inorganic microparticles have surface-attached or surface-bonded organic moieties derived from the reaction of the coupling agent(s) with, e.g., silanol groups on the surface of the microparticles. Generally, such a sol is prepared first and then combined with the other components (a) and (b) of the composition. But such a sol can also be prepared by carrying out the surface modification in the presence of component (a) and/or component (b). When non-polymeric coupling agent(s) are used for surface modification, the coupling agent(s) are selected so as to not only be capable of chemically reacting (or strongly physically interacting) with chemical groups on the surface of the microparticles, but also preferably to be capable of chemical reaction with component (a) and/or component (b). Preferred coupling agents thus comprise at least one functional group, e.g., mercapto, amino, epoxy, carboxy, or oxazolinyl, etc., which can react with carboxy, mercapto, oxazolinyl, or oxazinyl group(s) on component (a) and/or component (b). Representative examples of useful coupling agents include 3-mercaptopropyltrimethoxysilane, 3-glycidoxypropyltrimethoxysilane, 3-aminopropyltriethoxysilane, N-(trimethoxysilylpropyl) ethylenediamine triacetic acid and ammonium salts thereof, (2-trimethoxysilylethyl)thioacetic acid and its ammonium salt, 2-(2-oxazolinyl)ethyltrimethoxysilane, and 6-(2-oxazolinyl)-4-thiaheptyltrimethoxysilane, with 3-mercaptopropyltrimethoxysilane and 6-(2-oxazolinyl)-4-thiaheptyltrimethoxysilane being preferred.

The surfactant polymer component, crosslinking polymer component, and sol of surface-modified microparticles can be combined in any order and manner of combination by direct mixing using any conventional means such as mechanical agitation, ultrasonic agitation, stirring, and the like. For example, the sol can be added to the combined polymer formulation, i.e., a mixture of the surfactant polymer component and the crosslinking polymer component, or prior to formulation to either the surfactant polymer component or the crosslinking polymer component. Preferably, the crosslinking component and/or the surfactant component are added to the sol while maintaining the pH of the mixture at values greater than 8 to avoid precipitation of one or more of the components.

Sol can be added in an amount sufficient to impart the degree of abrasion resistance desired for a particular application, while maintaining the desired surface energy characteristics. Generally, the coating formulation contains from about 1 to about 70 weight percent inorganic oxide, preferably from about 5 to about 40 weight percent.

The coating compositions of the invention can contain additional components such as fillers. Thus, for example, should transparency of the coating not be a requirement, e.g., in paints, etc., the compositions can contain dyes; inorganic, non-colloidal fillers such as tin oxide, titanium dioxide, alumina, or alumina-coated silica; non-colloidal silica (e.g., fumed silica); carbon black; and/or organic fillers.

The coating compositions can be cured at elevated and room temperatures, e.g., from about 20° to about 125° C. The use of elevated temperatures, e.g., 50° C. to 125° C., generally results in faster cure and superior coating hardness and is generally preferred.

The cured coatings are transparent, translucent, or opaque, depending on the size of the microparticles and whether additional components such as fillers have been incorporated. The cured coatings are resistant to solvents and water, and have excellent abrasion resistance without sacrificing their very low surface energy (10–15 dynes/cm) properties.

The coating compositions of this invention can be applied to a wide variety of substrates to impart abrasion resistance, solvent resistance, and corrosion resistance, as well as to impart release characteristics to the surface. In general, the type of substrates that can be coated in accordance with this invention include rigid and flexible substrates such as: plastics, glass, metal, wood, paper, and ceramics. For example, soft substrates such as plastics can be rendered abrasion resistant and mar resistant by the practice of this invention. Representative examples include: lenses used in ophthalmic spectacles, sunglasses, optical instruments, illuminators, watch crystals, and the like; plastic window glazing; signs and decorative surfaces such as wallpaper and vinyl flooring. Metal surfaces can be rendered resistant to corrosion by the practice of this invention, whereby the brilliance of polish can be maintained on decorative metal strips and mirrors. Further, the coating compositions can be colored by addition of dyes and pigments and applied to surfaces as a paint.

In addition, the coating composition can be applied as a protective coating on aircraft (in deicing wings), as automotive polish, as automotive topcoat, and as automotive transit coating; can be used on carpet, concrete, fishing line, formica, medical surfaces, siding, sinks, showers, textiles, vinyl flooring, and wallcovering; and can be used in food release, mold release, adhesive release, and the like.

The coating compositions of this invention can be applied to a substrate using any conventional technique. For example, the composition can be brushed or sprayed (e.g., as an aerosol) onto a substrate, or the substrate can be immersed in the coating composition or can be spin-coated. When coating flat substrates, it is preferable to knife- or bar-coat the substrate to ensure uniform coatings.

The coating compositions of the present invention can be applied to a substrate in any desired thickness. It has been found that coatings as thin as a few microns offer excellent abrasion resistance and low surface energy. However, thicker coatings (e.g., up to about 20 microns or more) can be obtained by applying a single thicker coating or by applying successive layers of the coating to the substrate. The latter can be done by applying a layer of the coating composition to the substrate and then drying without extensive curing, for example, by heating the coated substrate for about one minute at about 75° C. Successive layers of the coating can then be applied to dried, but uncured, coatings. This procedure can be repeated until the desired coating thickness is obtained.

Objects and advantages of this invention are further illustrated by the following examples, but the particular materials and amounts thereof recited in these examples, as well as other conditions and details, should not be construed to unduly limit this invention. In the examples, all temperatures are in degrees Centigrade and all parts and percentages are by weight unless indicated otherwise.

EXAMPLES

In the following examples and comparative examples (controls), the precursor polymers such as for example the surfactant component polymer and the crosslinking component polymer were prepared essentially as described in U.S. Pat. Nos. 5,382,639, 5,294,662, 5,006,624, and 4,764,564 cited above. The coating compositions were prepared, applied to a polyethylene terephthalate film substrate, cured, and evaluated for low surface energy properties and abrasion resistance performance. The test methods utilized are described below:

The "pen test" described in U.S. Pat. No. 5,294,662 was used. The test involved drawing a fine line on a coated film using a black Sharpie™ fine point permanent marker available from the Sanford Company. A number value of 0 to 3 was assigned based on the appearance of the resulting line. The values were defined as follows: 3: totally unwettable, ink dewets to form a discontinuous line (best); 2: ink partially dewets to form a very thin continuous line; 1: some dewetting; 0: totally wettable, same as non-treated surface (worst). For illustration of the method, a line written on a polytetrafluoroethylene surface dewets slightly and is assigned a 1.

The abrasion resistance of the coatings was determined by measuring the resulting % haze of a film sample using ASTM D-1044-90 on a Teledyne Tabor Abrasor with a 500 g load and a pair of CS-10F Calibrasers. The lower the resulting percent haze, the higher the abrasion resistance of the coating.

The resulting coatings were also tested for water contact angle by essentially the method described by Zisman, W. A., in "Contact Angle, Wettability, and Adhesion," Advances in Chemistry, Series 43, American Chemical Society, Washington, D.C. (1964). An ESCA test comprised evaluating the samples for surface fluorine content using a ¼ inch by ¼ inch portion of the coated sample using a Fison F Inspector™ ESCA analyzer. The sample was scanned from 0 electron volts to 1100 electron volts, and the results were averaged for four scans.

Comparative Example 1

To a 5L 3-necked flask equipped with a mechanical stirrer, a cooling condenser, and a temperature control device was added 2-(N-ethylperfluorooctanesulfonamido)ethyl acrylate (600 g, available as FX-13™ acrylate from the 3M Company), 2-carboxyethyl acrylate (400 g), azobisisobutyrylnitrile (AIBN, 6.0 g), N-methylpyrrolidinone (400 g), and isopropanol (600 g). The solution was purged with nitrogen for about 3 min. and heated to initiate polymerization. As the reaction became exothermic the temperature control was adjusted to 70° C. and heating continued at that temperature for about 2.5 hours. The cooling condenser was replaced by a distillation condenser, and isopropanol was distilled from the reaction mixture. The resulting polymer was neutralized by addition of aqueous ammonia and water until the solution was basic.

To 30 g of the above acrylate copolymer solution (8.1 g solids, 22.5 mmol of carboxylic groups) was added an aqueous solution of isopropenyl oxazoline/ethyl acrylate/ methyl methacrylate terpolymer (85/5/10, 3.2 g solids, 24.8 mmol of oxazoline groups, available from Nippon Shokubai Co., Ltd. as CX-WS-300™ crosslinker) followed by 2.5 g of N-methyl pyrrolidinone. The pH of the resulting solution was adjusted to 7.5–8 by adding aqueous ammonia. This formulation is hereinafter referred to as "WXF Formulation" (Waterborne Crosslinkable Fluorochemical coating system).

This WXF Formulation was allowed to sit at room temperature for about 1–2 days after which it was then coated onto a primed polyethylene terephthalate film with a #30

Mayer rod to a coating thickness of about 10–12 microns. The resulting coating was then heated in a oven at 120° C. for 30 min. The finished film was transparent and resistant to solvents and water.

The fluorine percentage of this composition was calculated as 22% from the known fluorine content of the monomers. The resulting film was evaluated using the described "pen test". The results are shown in Table 1.

Example 1

An aqueous dispersion of colloidal silica (Ludox™ AS-40 hydrosol, 100 g solids) was diluted with deionized water to give 800 g total. Concentrated aqueous ammonia (3.0 g) and 3-mercaptopropyltrimethoxysilane (1.60 g, 8.2 mmol) were added to the dispersion, followed by heating at 80° C. for 10 hours to give a translucent, colorless suspension of mercaptan-functionalized silica ("MPTS-f-$SiO_2$"). To this suspension was further added N-methylpyrrolidinone (108 g) and CX-WS-300™ crosslinker (14.4 g solids).

Part of the resulting combination (1.1 g solids, 0.95 g $SiO_2$) was mixed with "WXF Formulation" (1.9 g solids, prepared essentially as in Comparative Example 1) to give a final coating formulation (14.3 weight % solids, 32 weight % $SiO_2$ by solids). The formulation was then coated, cured, and evaluated essentially as described in Comparative Example 1. The results of testing are shown in Table 1.

Example 2

To the CX-WS-300™ crosslinker-containing MPTS-f-$SiO_2$ suspension described in the first paragraph of Example 1 (1.1 g organic solids, 0.95 g $SiO_2$) was added "WXF Formulation" (4.1 g solids) under stirring to yield a final coating formulation (15.5 weight % solids, 18.4 weight % $SiO_2$ by solids). The formulation was then coated and evaluated essentially as described in Comparative Example 1. The results of testing are shown in Table 1.

Example 3

A mixture of 3-mercaptopropyltrimethoxysilane (19.6 g, 0.1 mol), 2-isopropenyloxazoline (11.1 g, 0.1 mol) and 20 drops of triethylamine was heated under a nitrogen atmosphere at 80° C. overnight. A 3.2 g sample of the resulting mixture was vacuum fractionated (150° C., 0.06 torr) using a Kugelrohr apparatus to give 2.43 g of a clear, colorless distillate of a silane coupling agent (6-(2-oxazolinyl)-4-thiaheptyltrimethoxysilane) having the formula $(CH_3O)_3SiCH_2CH_2CH_2SCH_2C(Me)C_3H_4NO$, where —$C_3H_4NO$ represents an oxazolinyl group.

One hundred grams Nalco™ TX-8800 silica sol (30 wt % silica in isopropanol), 100 g deionized water, and 3 drops concentrated ammonium hydroxide solution (28–30 eight percent) were mixed and stirred at a pH of 7.8. To 80 g of the resulting mixture was added 1.76 g of the above-described silane coupling agent, and the mixture was then shaken to dissolve the coupling agent. (This corresponds to 0.47 mmol coupling agent per gram of silica.)

To the mixture (1.6 g solids, 1.5 g of $SiO_2$, 0.75 mmol of oxazoline groups) was added an aqueous FX-13™/carboxyethyl acrylate (CEA) copolymer solution (0.245 g solids, 0.68 mmol of neutralized carboxylic groups, prepared essentially as in Comparative Example 1), followed by addition of N-methylpyrrolidinone (1.0 g). The resulting combination was then mixed with "WXF Formulation" (4.1 g solids) to yield a final coating formulation with 25 weight % $SiO_2$ by solids. The formulation was then coated and evaluated essentially as described in Comparative Example 1. The results of testing are shown in Table 1.

Comparative Example 2

To a 5L 3-necked flask equipped with a mechanical stirrer, a cooling condenser, and a temperature control device was added 2-(N-ethylperfluorooctanesulfonamido)ethyl acrylate (720 g, 1.15 mol), acrylic acid (300 g, 4.2 mol), 3-(trimethoxysilyl)propyl methacrylate (50 g, 0.23 mol), 3-mercaptopropionic acid (30 g, 0.28 mol), azobisisobutyrylnitrile (AIBN, 6.0 g), N-methylpyrrolidinone (400 g), and isopropanol (600 g). The resulting solution was purged with nitrogen for about 3 min. and heated to initiate polymerization. As the resulting reaction became exothermic, the temperature was adjusted to 75° C. and heating was continued at that temperature for about 4 hours. The cooling condenser was replaced by a distilling head, and isopropanol was distilled from the reaction mixture. The resulting polymer was neutralized by addition of aqueous ammonia and water until the solution was basic.

To the resulting acrylate copolymer solution was added an aqueous solution of isopropenyl oxazoline/ethyl acrylate/methyl methacrylate terpolymer (85/10/5, 581 g solids, 4.45 mol of oxazoline groups, available from Nippon Shokubai Co., Ltd. as CX-WS-300™ crosslinker) under stirring. The pH of the resulting formulation was adjusted to 7.5–8 by adding aqueous ammonia. This formulation is hereinafter referred to as "WXF/AA Formulation". The formulation was then coated, stored for a week at room temperature, and evaluated essentially as described in Comparative Example 1. The results of testing are shown in Table 1.

Comparative Example 3

An aqueous solution of 2-(N-ethylperfluorooctanesulfonamido)ethyl acrylate (FX-13™ acrylate) and 2-isopropenyl-2-oxazoline ("IPO") copolymer (20/80 weight ratio, 1.9 g solids, 13.7 mmol of oxazoline groups) prepared essentially according to the method described in U.S. Pat. No. 5,294,662) was mixed with an aqueous solution of FX-13™ acrylate/CEA copolymer (60/40 weight ratio, prepared essentially as in Comparative Example 1, 4.1 g solids, 11.3 mmol of carboxylic acid groups), followed by addition of 2.9 g of N-methylpyrrolidinone and 26.3 g of water. The resulting solution (10- weight % solids) was clear.

To colloidal silica (Ludox™ AS-40 hydrosol, 1.0 g solids) was gradually added, under stirring, the above-described solution (3.0 g of solids) to produce a translucent silica-containing formulation (12.3 weight % solids, 25 weight % $SiO_2$ by solids). This formulation was then coated, cured, and evaluated essentially as described in Comparative Example 1. The results of testing are shown in Table 1.

Comparative Example 4

To colloidal silica (40 g solids, Ludox™ AS-40 hydrosol available from DuPont, 22 nm average particle diameter) was added concentrated aqueous ammonia (about 0.5 g), water (80 g), N-methylpyrrolidinone (26 g), and the CX-WS-300™ crosslinker described in Comparative Example 1 (5.2 g solids) with stirring. A translucent suspension (17.5 weight % solids) was obtained.

To the CX-WS-300™ crosslinker/$SiO_2$ suspension described above (1.75 g solids, 1.55 g $SiO_2$) was added under vigorous stirring a solution of "WXF Formulation" (1.75 g solids) described in Comparative Example 1 to produce a translucent suspension (17.5 weight % solids, 44 weight % SiO₂ by solids). This silica-containing formulation was then coated, cured, and evaluated essentially as described in Comparative Example 1. The results of testing are shown in Table 1.

Comparative Example 5

As in Comparative Example 4, "WXF Formulation" (3.1 g solids) was added to the translucent suspension containing colloidal silica, CX-WS-300™ crosslinker, and N-methylpyrrolidinone (1.75 g solids, 1.55 g SiO₂) to produce a milky suspension (17.5 weight % solids, 32 weight % SiO₂ by solids). This silica-containing formulation was then coated, cured, and evaluated essentially as described in Comparative Example 1. The results of testing are shown in Table 1.

Comparative Example 6

As in Comparative Example 4, "WXF Formulation" (6.7 solids) was added to the translucent suspension containing colloidal silica, CX-WS-300™ crosslinker, and N-methylpyrrolidinone (1.75 g solids) to produce a translucent suspension (17.5 weight % solids, 18.4 weight % SiO₂ by solids). This silica-containing formulation was then coated, cured, and evaluated essentially as described in Comparative Example 1. The results of testing are shown in Table 1.

Example 4

An aqueous dispersion of colloidal silica (Ludox™ AS-40 hydrosol, 100 g solids) was diluted with deionized water (800 g), concentrated aqueous ammonia (3.0 g), and 3-mercaptopropyltrimethoxysilane (1.60 g). The resulting HS(CH₂)₃Si (OMe)₃ functionalized SiO₂ ("MPTS-f-SiO₂") suspension was heated for 10 hours at 80° C. with stirring to give a translucent, colorless suspension. Part of this suspension (20 g solids) was mixed with isopropenyloxazoline (IPO, 10.0 g), isopropyl alcohol (60 g), VAZO-50™ initiator (2,2'-azobis(2-amidinopropane) dihydrochloride, 0.10 g), and water (20 g), followed by concentrated ammonia (1.0 g). The resulting suspension was purged with nitrogen and heated to 55° C. for 24 hours. A small amount of VAZO-50™ initiator (2,2'-azobis(2-amidinopropane) dihydrochloride, about 0.02 g) was added to the suspension after 8 hours. The isopropanol and some of the water were evaporated at 60° C. under reduced pressure to provide 106 g of a translucent suspension. The solids content (23.1 weight %) was measured by drying a small sample in a forced air oven at 105° C. Since the content of silica should be 18.9 weight % in the suspension, the poly(IPO) content was calculated to be 4.2 weight %. The conversion of IPO to poly(IPO) was therefore about 55%. Elemental analysis: C: 8.8, H: 1.5, N: 0.2. The ratio of IPO to SiO₂ was 1:4.5 by weight.

Part of the suspension (2.4 g solids, 4.7 mmol of oxazoline groups) was mixed with a FX-13™/CEA(60/40) surfactant prepared essentially as in Comparative Example 1 (1.53 g solids, 4.3 mmol of carboxylic groups), followed by addition of N-methylpyrrolidinone (1.8 g) and water (8.0 g). The resulting suspension was combined with a "WXF Formulation" (4.6 g solids) to form a final coating suspension (22 weight % SiO₂ by solids). This suspension was then coated, cured, and evaluated essentially as described in Comparative Example 1. The results of testing are shown in Table 1.

Example 5

An aqueous dispersion of colloidal silica (200 g, Nalco™ 1042 hydrosol, 34% solids, pH=3.2) was diluted with water to 17 weight % solids. To this was added 3-mercaptopropyltrimethoxysilane (HS (CH₂)₃Si (OMe)₃, Aldrich, 3.3 g, 16.8 mmol). The resulting suspension was heated for 24 hours at 75° C. with stirring to give a translucent, colorless suspension.

A sample of the above suspension (34 g solids) was diluted with deionized water to 10 weight % solids (140 g of water), and the pH was adjusted to 9. To this was added a solution of 2-carboxyethyl acrylate (34 g, 0.12 mol) and water (306 g) at a pH of approximately 9.5. The resulting mixture was heated to 75° C. and degassed with nitrogen for 15 min. Initiator t-butyl hydroperoxide (0.25 g, 70 weight % in water) was added, and the suspension was stirred at 75° C. under nitrogen for 24 hours. The resulting poly(CEA) grafted silica had a weight ratio of SiO₂ to CEA=1:1. Samples with different SiO₂ to CEA ratios (from 1:1 to 10:1) were prepared by essentially the same method but by varying the feeding ratio.

Part of the above suspension (10 g solids, 23 mmol of carboxylic groups) was mixed with crosslinker CX-WS-300™ (3.25 g solids, 25 mmol of oxazoline groups) to produce a crosslinker-containing suspension with 50.6 weight % SiO₂. This formulation will be referred to hereinafter as "PIPO/SiO₂-g-poly(CEA), 1:1".

A sample of "PIPO/SiO₂-g-poly(CEA), 1:1" (1.5 g solids, 0.75 g SiO₂) was mixed with "WXF Formulation" (1.75 g solids) to produce a coating formulation with 23.4 weight % SiO₂ by solids. This formulation was then evaluated essentially as described in Comparative Example 1. The test results are shown in Table 1.

Example 6

A sample of "PIPO/SiO₂-g-poly(CEA), 1:1" (3.0 g solids, 1.5 g SiO₂) was mixed with "WXF Formulation" (1.75 g solids) to produce a formulation with 32 weight % SiO₂ by solids. This formulation was then evaluated essentially as described in Comparative Example 1. The test results are shown in Table 1.

Example 7

A suspension of "SiO₂-g-poly(CEA), 5:1" (10.0 g solids, 11.6 mmol of carboxylic acid groups) was mixed with crosslinker CX-WS-300™ (1.67 g solids, 12.7 mmol of oxazoline groups) to produce a sample of "PIPO/SiO₂-g-poly(CEA), 5:1". Part of this sample (1.0 g solids, 0.71 g SiO₂) was mixed with "WXF Formulation" (1.75 g solids) to yield a final coating formulation with 26 weight % SiO₂ by solids. This formulation was then evaluated essentially as described in Comparative Example 1. The test results are shown in Table 1.

Example 8

A suspension of "SiO₂-g-poly(CEA), 10:1" (6.0 g solids, 3.8 mmol of carboxylic acid groups) was mixed with crosslinker CX-WS-300™ (0.55 g solids, 4.2 mmol of oxazoline groups) to produce a sample of "PIPO/SiO₂-g-poly(CEA), 10:1". Part of this sample (0.62 g solids, 0.51 g SiO₂) was mixed with "WXF Formulation" (1.75 g solids) to yield a final coating formulation with 21.7 weight % SiO₂ by solids. This formulation was then evaluated essentially as described in Comparative Example 1. The test results are shown in Table 1.

Examples 9 and 10

A dispersion of silica (Nalco™ 1042 hydrosol, 153 g, 34% solids, pH=3) was mixed with N-methyl pyrrolidinone (208 g). The resulting mixture was placed on a rotary evaporator, and water was removed to a final weight of 246 g (21 weight % solids). To the resulting suspension (100 g) was added 3-mercaptopropyltrimethoxysilane (1 g), and the resulting combination was heated for 16 hours at 60° C. Portions of the resulting clear suspension were used in Examples 9 and 10.

Example 9

The above-described suspension (10.5 g solids, average particle size: 20 nm.) was mixed with FX-13™ acrylate (15.0 g, available from the 3M Company), carboxyethyl acrylate (10.0 g), AIBN (0.40 g), and isopropanol (40.0 g). The resulting suspension was purged with nitrogen for about 5 min. and heated to 70° C. for 3 hours. The isopropanol was then removed from the suspension under reduced pressure, and the suspension was neutralized with ammonia and then further diluted with water to 21.5 weight % solids. A clear suspension was obtained.

Part of the above suspension (4.3 g solids) was mixed with CX-WS-300™ crosslinker (1.06 g solids) to form a clear coating formulation. The formulation was aged at 65° C. for 6 hours and was then evaluated essentially as described in Comparative Example 1. The test results are shown in Table 1.

Example 10

A suspension of MPTS-f-SiO$_2$ (0.25 mmol/g SiO$_2$, prepared essentially as described above) in N-methylpyrrolidinone (50.0 g solids SiO$_2$ with 79 g N-methylpyrrolidinone, average particle size: 20 nm) was mixed with FX-13™ acrylate (70.0 g), acrylic acid (30.0 g), AIBN (0.40 g), and isopropanol (70.0 g). The resulting suspension was purged with nitrogen for about 5 min. and heated to 70° C. for 7 hours. The isopropanol was then removed from the suspension under reduced pressure and neutralized with ammonia to basic. A milky but stable suspension was obtained.

Part of the above suspension (11.5 g solids) was mixed with CX-WS-300™ crosslinker (4.2 g solids) to form a stable coating formulation. The formulation was evaluated essentially as described in Comparative Example 1. The test results are shown in Table 1.

Example 11

Alumina-coated silica sol (Nalco $_{1056}$™ hydrosol, 30 weight % solids, 350 g) was mixed with mercaptopropyltrimethoxysilane (0.52 g, 2.7 mmol) and water (350 g). After adjusting the pH to 3.6 with acetic acid, the dispersion was heated overnight at 80° C. for 16 hours, and an additional 350 g of water was then added to yield a MPTS-functionalized, alumina-coated silica dispersion at 15 weight % solids. Part of this prepared dispersion (13.3 g) was diluted with water to 20 g, and 10 weight % aqueous acrylic acid (80 g) was added. The resulting dispersion was heated to 65° C., degassed with nitrogen, and t-butylhydroperoxide added (0.11 g, 70 weight % solution from Aldrich). The resulting combination was then purged with nitrogen and heated at 70° C. overnight, and the pH was then adjusted to 9 with ammonium hydroxide. The resulting suspension was very viscous, so an additional 50 g of water was added to give 4 weight % total solids.

To 50 g of this suspension (2.0 g solids, 22 mmol of carboxylic groups) was added CX-WS-300™ crosslinker (3.0 g solids, 23 mmol of oxazoline groups). The resulting suspension (1.0 g solids) was further formulated with "WXF/AA Formulation" (Comparative Example 2, 0.34 g solids) to yield a coating formulation (7.5 weight % solids, 5.0 weight % SiO$_2$ (Al$_2$O$_3$) based on solids). This coating formulation was then evaluated essentially as described in Comparative Example 1. The test results are shown in Table 1.

Example 12

To the coating formulation described in Example 11 (1.0 g solids) was added "WXF/AA Formulation" (Comparative Example 2, 1.68 g solids) to yield a fluorochemical-containing formulation (10.5 weight % solids, 2.5 weight % Sio$_2$(Al$_2$O$_3$) based on solids). The formulation was then evaluated essentially as described in Comparative Example 1. The test results are shown in Table 1.

TABLE 1

| Sample | Weight % F | Weight % SiO$_2$ | Haze %, 200 Cycles | Coating Components | ESCA C/F/Si (%) | Pen Test | Water Contact Angle (degrees) |
|---|---|---|---|---|---|---|---|
| Comparative Example 1 | 22.2 | 0 | 20 | WXF Formulation | 49/28/0 | 3 | 100 |
| Example 1 | 14 | 32 | 10.1 | WXF Formulation + MPTS-f-SiO$_2$ | 49/24/2.1 | 2 | 117 |
| Example 2 | 17.5 | 18.4 | 13 | WXF Formulation + MPTS-f-SiO$_2$ | 51/24/1.7 | 3 | 117 |
| Example 3 | 16.2 | 25 | 7.7 | WXF Formulation + IPO-f-SiO$_2$ | 56/20/1.3 | 3 | 114 |
| Comparative Example 2 | 22.1 | 0 | 28.5 | WXF/AA Formulation | 56/20/0 | 3 | 101 |
| Example 4 | 17.7 | 22 | 7.6 | WXF Formulation + p(IPO)-g-SiO$_2$ = 4.5:1 | 49/25/1.7 | 3 | 111 |
| Comparative Example 3 | 18.4 | 25 | 10 | WXF/FX-13™/PIPO(20/80) + SiO$_2$ | 46/26/1.5 | 3 | 100 |
| Comparative Example 4 | 11.1 | 44 | 5.9 | WXF Formulation + SiO$_2$ | 39/21/7.8 | 0 | 136 |
| Comparative Example 5 | 14.2 | 32 | 9.8 | WXF Formulation + SiO$_2$ | 46/26/1.8 | 3 | 102 |
| Comparative Example 6 | 17.6 | 18.4 | 13 | WXF Formulation + SiO$_2$ | 46/28/0.6 | 3 | 104 |
| Example 5 | 11.8 | 23.4 | 9.4 | WXF Formulation + p(CEA)-g-SiO$_2$ = 1:1 | 56/21/0 | 3– | 109 |
| Example 6 | 8.1 | 32.0 | 4.4 | WXF Formulation + p(CEA)-g-SiO$_2$ = 1:1 | 56/25/0 | 3– | 109 |
| Example 7 | 14.0 | 26 | 10.8 | WXF Formulation + p(CEA)-g-SiO$_2$ = 5:1 | 54/23/0 | 3 | 112 |

TABLE 1-continued

| Sample | Weight % F | Weight % SiO$_2$ | Haze %, 200 Cycles | Coating Components | ESCA C/F/Si (%) | Pen Test | Water Contact Angle (degrees) |
|---|---|---|---|---|---|---|---|
| Example 8 used in the vinyl floor sample | 16.6 | 21.7 | 7.3 | WXF Formulation + p(CEA)-g-SiO$_2$ = 10:1 | 57/19/0 | 3 | 112 |
| Example 9 | 17.6 | 24 | 10.9 | p(FX-13 ™/CEA)-g-SiO$_2$ & crosslinker | 47/28/1.5 | 3 | 114 |
| Example 10 | 17.6 | 24.2 | 19.5 | p(FX-13 ™/AA)-g-SiO$_2$ & crosslinker | 53/24/0 | 3 | 112 |
| Example 11 | 5.6 | SiO$_2$ (Al$_2$O$_3$) 5% | 17.2 | WXF/AA Formulation + p(AA)-g-SiO$_2$ (Al$_2$O$_3$) = 1:1 | 71/6.5/0 | 0 | 82 |
| Example 12 | 13.7 | SiO$_2$ (Al$_2$O$_3$) 2.5% | hazy coating | WXF/AA Formulation + p(AA)-g-SiO$_2$(Al$_2$O$_3$) = 1:1 | 63/11/0 | 2 | 90 |

Example 13

One-half of the surface area of a 1 ft×1 ft square sample of vinyl flooring was coated with a water-based coating composition of this invention (prepared essentially as in Example 8, having 21.7 weight % silica and 16.6 weight % fluorine content) and cured at room temperature. The remaining one-half of the surface area was left uncoated. One-half of the surface area of a second sample of vinyl flooring was coated with the same coating composition and cured at 120° C. for three hours. The initial gloss of the coated vinyl samples was measured using a Minolta Gloss Meter at 60 degrees from the plane of the sample, sampling at randomly determined areas in the coated and uncoated areas of the vinyl. The samples were then subjected to a walk-on test in which approximately 60,000 people walked though the test site area containing the two samples and the gloss of the soiled samples determined as before. Because the uncoated portions of both vinyl samples were identical in appearance, the gloss was measured on one. Next, the samples were cleaned with soap and water and the gloss of the cleaned samples measured again. The average measured gloss for these samples is reported in Table 2.

TABLE 2

| | Uncoated | Coated: Room Temperature Cure | Coated: Cured at 120° C. for 3 hrs |
|---|---|---|---|
| Initial gloss | 13.2 ± 3.4 | 40.7 ± 10.9 | 42.5 ± 19.2 |
| Soiled | 12.5 ± 1.2 | 20.6 ± 7.2 | 31.2 ± 6.3 |
| Cleaned | 14.8 ± 0.4 | 21.2 ± 7.3 | 31.2 ± 9.2 |

As can be seen from the data in Table 2, the measured initial gloss of both coated samples (room temperature-cured and thermally-cured) was significantly greater than that of the uncoated sample, and the abrasion-resistance of the coated samples was sufficient to enable the maintenance of a higher level of gloss after soiling and/or cleaning.

To evaluate the release properties of the coatings (see Table 3 below), the samples were treated with common staining materials for a prescribed period of time (indicated below) and then wiped with a dry cloth. If a stain persisted, the sample was then wiped with a solution of dish detergent, followed by wiping with isopropanol if necessary. The staining materials were as follows:

Spaghetti Sauce
Permanent Ink
Mustard
Black Shoe Polish
Nail Polish

The stain ratings were quantified as follows:

1 Severe stain; stain area shows no difference before and after wiping.
2 Strong mark; stain is slightly removed after wiping.
3 Slight mark; stain is mostly removed during wiping but is still visible.
4 Slight change in luster after wiping; a few isolated marks are visible.
5 No visible change; no stain after wiping.

TABLE 3

| | Before Walk-on Test | | | | | | | | |
|---|---|---|---|---|---|---|---|---|---|
| | Uncoated | | | Room Temperature Cure | | | 120° C./3 hrs Cure | | |
| | Dry | Wet | iPrOH | Dry | Wet | iPrOH | Dry | Wet | iPrOH |
| Spaghetti Sauce | | | | | | | | | |
| 10 minutes | | | | | | | | | |
| 24 hours | 4 | 5 | | 4 | 5 | | 5 | 5 | |

TABLE 3-continued

Ink

| | | | | | | | | | |
|---|---|---|---|---|---|---|---|---|---|
| 10 minutes 24 hours | 1 | 1 | 1 | 1 | 1 | 5 | 1 | 1 | 4–5 |

Mustard

| | | | | | | | | | |
|---|---|---|---|---|---|---|---|---|---|
| 10 minutes 24 hours | 1 | 5 | | 1 | 5 | | 1 | 5 | |

Shoe Polish

| | | | | | | | | | |
|---|---|---|---|---|---|---|---|---|---|
| 10 minutes 24 hours | 1 | 1 | 1 | 1 | 2 | 5 | 1 | 4 | 5 |

Nail Polish

| | | | | | | | | | |
|---|---|---|---|---|---|---|---|---|---|
| 10 minutes 24 hours | 1 | 1 | 4–5 | 1 | 5 | 5 | 1 | 1 | 5 |

After Walk-on Test

| | Uncoated | | | Room Temperature Cure | | | 120° C./3 hrs Cure | | |
|---|---|---|---|---|---|---|---|---|---|
| | Dry | Wet | iPrOH | Dry | Wet | iPrOH | Dry | Wet | iPrOH |
| Spaghetti Sauce | | | | | | | | | |
| 10 minutes 24 hours | 4 | 5 | | 5 4 | 5 | | 5 3 | 5 | |
| Ink | | | | | | | | | |
| 10 minutes 24 hours | 1 | 1 | 1 | 1 1 | 1 1 | 4–5 4–5 | 1 1 | 1 1 | 4 3–4 |
| Mustard | | | | | | | | | |
| 10 minutes 24 hours | 1 | 5 | | 5 1 | 5 | | 5 1 | 5 | |
| Shoe Polish | | | | | | | | | |
| 10 minutes 24 hours | 1 | 1 | 1 | 4 1 | 5 4 | 4–5 | 5 1 | 5 4–5 | 5 |
| Nail Polish | | | | | | | | | |
| 10 minutes 24 hours | 1 | 1 | 1–2 | 1 1 | 1 1 | 5 5 | 3 1 | 3 5 | 5 5 |

In Table 3, "dry" refers to wiping the stained sample with a dry cloth, "wet" refers to wiping the sample with a dish detergent solution, and "iPrOH" refers to wiping the sample with isopropanol. As can be seen from the data in Table 3, the coating composition of the present invention provided improved protection of surfaces against staining, relative to an uncoated surface. In particular, the coating composition allowed stains to be removed more completely and under less rigorous conditions than for the uncoated sample.

Various modifications and alterations of this invention will become apparent to those skilled in the art without departing from the scope and spirit of the invention.

We claim:

1. A water-based composition comprising an aqueous solution, emulsion, or dispersion of
   (a) a water-soluble or water-dispersible polymer or oligomer having at least one anionic moiety which is capable of reacting with an oxazoline or oxazine moiety;
   (b) a water-soluble or water-dispersible polymer or oligomer having at least one oxazoline or oxazine moiety; and
   (c) a sol comprising a colloidal dispersion of surface-modified, inorganic microparticles in liquid, said microparticles having polymeric or non-polymeric, surface-attached organic moieties;
   at least one of said components (a), (b), and (c) further comprising at least one fluoroaliphatic moiety.

2. The composition of claim 1 wherein said polymer or oligomer having at least one anionic moiety further comprises at least one fluoroaliphatic moiety.

3. The composition of claim 1 wherein said polymer or oligomer having at least one oxazoline or oxazine moiety further comprises at least one fluoroaliphatic moiety.

4. The composition of claim 1 wherein said anionic moiety is a carboxylic acid or carboxylate group.

5. The composition of claim 1 wherein said polymer or oligomer having at least one anionic moiety comprises interpolymerized units derived from at least one fluoroaliphatic radical-containing acrylate and at least one carboxy-containing monomer.

6. The composition of claim 1 wherein said polymer or oligomer having at least one oxazoline or oxazine moiety comprises polymerized units derived from 2-isopropenyl-2-oxazoline.

7. The composition of claim 1 wherein said polymer or oligomer having at least one oxazoline or oxazine moiety comprises interpolymerized units derived from at least one aliphatic or fluoroaliphatic radical-containing acrylate and 2-isopropenyl-2-oxazoline.

8. The composition of claim 1 wherein said inorganic microparticles are substantially discrete and substantially monodisperse in size.

9. The composition of claim 1 wherein said inorganic microparticles have an average particle diameter in the range of from about 2 nanometers to about 200 nanometers.

10. The composition of claim 1 wherein said inorganic microparticles are present in an amount sufficient to impart improved abrasion resistance to the cured composition, while maintaining at least some low surface energy characteristics.

11. The composition of claim 1 wherein inorganic oxide constitutes from about 1 to about 70 weight percent of said composition based on the total eight of dispersed solids.

12. The composition of claim 1 wherein said inorganic microparticles comprise metal oxide selected from the group consisting of silica, titania, alumina, zirconia, vanadia, chromia, iron oxide, antimony oxide, tin oxide, and mixtures thereof.

13. The composition of claim 12 wherein said metal oxide is silica.

14. The composition of claim 1 wherein said inorganic microparticles are polymer-grafted.

15. The composition of claim 14 wherein said inorganic microparticles are grafted with polymer comprising polymerized units of at least one free-radically polymerizable, ethylenically-monounsaturated monomer.

16. The composition of claim 15 wherein said monomer is selected from the group consisting of ethylenically-monounsaturated acids and anhydrides; ethylenically-monounsaturated macromers; ethylenically-monounsaturated, substituted and unsubstituted esters, amides, and nitrites; vinyl monomers; vinylidene monomers; olefinic monomers; fluorochemical-containing acrylates and methacrylates; and heterocyclic monomers.

17. The composition of claim 15 wherein said monomer is selected from the group consisting of carboxyethyl acrylate, isopropenyl oxazoline, alkyl acrylates and methacrylates having from 1 to about 18 carbon atoms, acrylic acid, methacrylic acid, itaconic acid, fluorochemical-containing acrylates and methacrylates, and mixtures thereof.

18. The composition of claim 15 wherein said monomer is selected from the group consisting of carboxyethyl acrylate, isopropenyl oxazoline, acrylic acid, and fluorochemical-containing acrylates.

19. The composition of claim 14 wherein said inorganic microparticles are grafted with polymer by means of at least one coupling agent which comprises at least one functional group which can function as a chain transfer site for free radical polymerization.

20. The composition of claim 1 wherein said inorganic microparticles have been surface-modified by treatment with at least one non-polymeric coupling agent.

21. The composition of claim 20 wherein said coupling agent comprises at least one functional moiety that is capable of reaction with at least one of said components (a) and (b).

22. The composition of claim 21 wherein said functional moiety is selected from the group consisting of mercapto, amino, epoxy, carboxy, and oxazolinyl moieties.

23. The composition of claim 22 wherein said coupling agent is selected from the group consisting of 3-mercaptopropyltrimethoxysilane and 6-(2-oxazolinyl)-4-thiaheptyltrimethoxysilane.

24. The composition of claim 1 wherein at east one of said components (a) and (b) is surface-attached to said inorganic microparticles to form a material which serves both as said component (c) and as at least one of said components (a) and (b).

25. A water-based composition comprising an aqueous solution, emulsion, or dispersion of (a) a water-soluble or water-dispersible polymer or oligomer having interpolymerized units derived from at least one fluoroaliphatic-radical containing acrylate and at least one carboxy-containing monomer;

(b) a water-soluble or water-dispersible polymer or oligomer comprising interpolymerized units derived from 2-isopropenyl-2-oxazoline; and (c) a sol comprising a colloidal dispersion of polymer-grafted silica microparticles in liquid; wherein said microparticles are grafted with polymer comprising polymerized units of carboxyethyl acrylate.

26. The composition of claim 25 wherein said composition further comprises at least one ultraviolet absorber.

27. A coating comprising the cured composition of claim 1.

28. A coated article comprising the coating of claim 27.

29. The composition of claim 1 wherein said organic moieties are reactive with at least one functional group on at least one of said components (a) and (b).

30. The composition of claim 1 wherein said organic moieties are surface-attached through covalent bonds.

* * * * *